US012654953B2

(12) United States Patent
Wilkinson et al.

(10) Patent No.: US 12,654,953 B2
(45) Date of Patent: Jun. 16, 2026

(54) APPARATUS AND METHOD FOR FLIPPING AND POSITIONING ARTICLES

(71) Applicant: Steck Depositors Limited, Copthorne (GB)

(72) Inventors: Michael Herbert Wilkinson, Copthorne (GB); Thomas Peter Roberts, Copthorne (GB)

(73) Assignee: Steck Depositors Limited, Copthorne (GB)

( * ) Notice: Subject to any disclaimer, the term of this patent is extended or adjusted under 35 U.S.C. 154(b) by 1108 days.

(21) Appl. No.: 17/761,726

(22) PCT Filed: Sep. 21, 2020

(86) PCT No.: PCT/GB2020/052278

§ 371 (c)(1),
(2) Date: Mar. 18, 2022

(87) PCT Pub. No.: WO2021/058938

PCT Pub. Date: Apr. 1, 2021

(65) Prior Publication Data

US 2022/0340373 A1      Oct. 27, 2022

(30) Foreign Application Priority Data

Sep. 24, 2019 (GB) ..................................... 1913727

(51) Int. Cl.
 B65G 47/252 (2006.01)
 A21C 15/02 (2006.01)
 A21D 13/32 (2017.01)

(52) U.S. Cl.
 CPC ........... B65G 47/252 (2013.01); A21D 13/32 (2017.01); A21C 15/02 (2013.01)

(58) Field of Classification Search
 CPC ........ B65G 47/252; A21D 13/32; A21C 15/02
 (Continued)

(56) References Cited

U.S. PATENT DOCUMENTS

| | | | |
|---|---|---|---|
| 5,865,106 A | 2/1999 | van der Ent | |
| 2003/0008038 A1* | 1/2003 | Valenzky, Jr. ......... | A21D 15/02 426/94 |

(Continued)

FOREIGN PATENT DOCUMENTS

| | | |
|---|---|---|
| GB | 1264029 A | 2/1972 |
| GB | 2101066 A | 1/1983 |

(Continued)

OTHER PUBLICATIONS

WO-2019056468-A1 Machine translate (Year: 2026).*
(Continued)

*Primary Examiner* — Steven W Crabb
*Assistant Examiner* — Yeong Juen Thong
(74) *Attorney, Agent, or Firm* — Hamilton, Brook, Smith & Reynolds, P.C.

(57) ABSTRACT

An article inverting and displacing apparatus, a machine for making sandwiches comprising the apparatus, and a process of automatically inverting and displacing articles using the apparatus are described, wherein the apparatus comprises an engagement member (12) adapted to engage a lateral edge portion of a sandwich element; a drive unit (14) configured to drive the engagement member (12) to lift and turn the sandwich element engaged thereby about is opposite lateral edge to invert it; and a control unit configured to control the drive unit (14) to drive the engagement member (12) so that the opposite lateral edge of the sandwich element is caused to be raised to approximately at or above the level or height of the engaged lateral edge portion during the inverting step.

13 Claims, 12 Drawing Sheets

(58) Field of Classification Search
USPC ........................................ 99/450.4, 451, 452
See application file for complete search history.

(56) References Cited

U.S. PATENT DOCUMENTS

2015/0353296 A1    12/2015  Petryshen et al.
2022/0331974 A1*   10/2022  Lovedale ................ A23P 20/20

FOREIGN PATENT DOCUMENTS

GB          2507057 A      4/2014
WO     WO-2019056468 A1 *  3/2019   ............. B65G 13/02

OTHER PUBLICATIONS

Notification of Transmittal of the International Search Report and the Written Opinion of the International Searching Authority, or the Declaration for International Application No. PCT/GB2020/052278, "Apparatus and Method for Flipping and Positioning Articles", Date of Mailing: Dec. 4, 2020.
International Preliminary Report on Patentability for International Application No. PCT/GB2020/052278, "Apparatus and Method for Flipping and Positioning Articles", Date of Issuance: Mar. 15, 2022.

* cited by examiner (a)  (b)  (c)  (d)  (e)

APPARATUS AND METHOD FOR FLIPPING AND POSITIONING ARTICLES

This application is the U.S. National Stage of International Application No. PCT/GB2020/052278, filed Sep. 21, 2020, which designates the U.S., published in English, and claims priority under 35 U.S.C. § 119 or 365(c) to Great Britain Application No. 1913727.2, filed Sep. 24, 2019. The entire teachings of the above applications are incorporated herein by reference.

FIELD OF THE INVENTION

The present invention relates to an apparatus and method for flipping articles. In particular, the invention relates to an apparatus for flipping selected articles from a stream of such articles. The invention is particularly useful in manufacturing food articles, such as sandwiches, and the like, wherein it is necessary to flip a slice in a stream of items so that an automatic sandwich process can easily manufacture sandwiches.

BACKGROUND OF THE INVENTION

Sandwich making machines may be provided with a movable conveyor for receiving upper and lower sandwich elements arranged in at least two rows extending in the direction of movement of the conveyor, and a depositing device arranged and adapted to deposit a sandwich filling on each of the lower sandwich elements of a first of two adjacent rows on the conveyor. When the sandwich filling is complete, the upper sandwich element is picked up and placed upon the lower sandwich element. This is known in the industry as 'lidding'. After lidding, the sandwich can then pass to cutting and packaging equipment.

Lidding can be classified as 'wet' or 'dry'. Wet lidding is when the upper sandwich element has a stable topping, such as butter, mayonnaise, mustard, sauces, or the like, on it. Dry lidding is when the upper sandwich element is untopped or dry. Dry lidding is relatively straightforward, the upper sandwich element can be picked up by a vacuum pad and moved into position. Wet lidding is more of a challenge because the upper sandwich element is already wet with a sticky product on its top face and it is this face that must be placed on top of the lower sandwich element. Therefore the upper sandwich element must be picked up, turned over, moved into position, and then placed down flat onto the lower sandwich element.

It was the prior practice in the sandwich making industry to manually remove the upper sandwich element having the stable topping from the conveyor, turn it over, and place it on the lower sandwich element having the filling substance deposited thereon. Such practice is laborious and time consuming, however, and can reduce the yield of a manufacturing operation, increasing cost and reducing output over time.

Automated flipping devices significantly improve the efficiency, speed and reliability at which sandwich elements are processed. One approach might be for an automated flipping device to grip a lateral edge portion of an upper sandwich element, turn the sandwich element about its opposite lateral edge to invert it, displace it laterally, and superimpose it on an adjacent sandwich element on which a filling has been deposited. With such a device, however, the upper sandwich element would tend to be dragged into position, causing displacement of an unstable filling, for example salad pieces, such as tomato, cucumber, egg or leaf.

To avoid this problem, the upper sandwich element should lie in a horizontal plane as it is positioned over the filled lower sandwich element. This is a difficult operation to achieve, however, especially with bread slices as they are floppy and difficult to hold and turn over at the same time.

EP 2868201 A1 attempts to address the wet lidding problem. The apparatus described in this document comprises a suction nozzle to lift a wet lid off a conveyor belt, and a platen to place underneath the lifted wet lid, wherein the platen is adapted to rotate through 180 degrees and thereby drop the wet lid on a filled sandwich slice below.

An object of the present invention is to provide an alternative and/or improved apparatus for and process of automatically flipping articles.

SUMMARY OF THE INVENTION

In first aspect, the invention provides an article inverting and displacing apparatus, comprising:

an engagement member adapted to engage a lateral edge portion of a sandwich element;

a drive unit configured to drive the engagement member to lift and turn the sandwich element engaged thereby about its opposite lateral edge to invert it; and a control unit configured to control the drive unit;

wherein the control unit is configured to control the drive unit to drive the engagement member so that the opposite lateral edge of the sandwich element is caused to be raised to approximately at or above the level or height of the engaged lateral edge portion during the inverting step, and, optionally, subsequently the sandwich element is caused to lie in a generally horizontal plane.

The motion profile for the engagement member comprises an approximate arc portion and, optionally, a straight portion. The arc is a concave downward or convex upward curve. The motion profile may be in two or three dimensions.

By use of the apparatus of the present invention, the trailing edge of the upper sandwich element does not contact the lower sandwich element as the upper sandwich element is laterally displaced from its initial position to its final position where it is superimposed on the lower sandwich element. Thus, unstable sandwich filing remains in place on the lower sandwich element during the sandwich making operation. The apparatus is particularly useful for inverting and positioning bread slices but may be used to invert and position any similarly shaped article that is floppy.

Preferably, the control unit is configured to control the drive unit to cause the engagement member to move downwardly after the inverting step.

The velocity and motion profile of the engagement member are controlled to achieve the desired result. Preferably, the control unit is configured to control the drive unit so that an acceleration occurs during the transport of the engagement member. The acceleration preferably occurs during the arc motion profile or the inverting step as the engagement member turns the sandwich element. Preferably, the acceleration is between about 5 and about 15 m/s$^2$, such as 6, 7, 8, 9, 10, 11, 12, 13 or 14 m/s$^2$ (metres per second per second). Preferably the velocity or acceleration is such that the forces of gravity acting to flex or bend the sandwich element are outweighed by the acceleration forces that maintain the sandwich element straight or flat.

The control unit may be configured to control the drive unit to drive the engagement member so that a deceleration (negative acceleration), or a constant velocity, occurs after the inverting step or the acceleration.

It will be appreciated by the skilled person that the actual velocity, acceleration and/or deceleration required will depend on the article that is being flipped, for example its weight and dimensions.

A raised opposite lateral edge or trailing edge may be allowed to lower, at least in part, under the influence of gravity, until the sandwich element lies in a generally horizontal plane. Once in the horizontal plane, the sandwich element may be lowered by the engagement member or released by the engagement member. In this way, the sandwich element is caused to lie in a generally horizontal plane prior to being superimposed on another sandwich element.

Preferably, the engagement member is rotatable about a rotational axis. The rotational axis extends either in a direction generally parallel to or in a direction generally perpendicular to a main axis. Here, the "main axis" is the longitudinal axis, or the direction of movement, of the conveyor. The former will be the case where a first row of upper sandwich elements and a second row of lower sandwich elements extend in the direction of the main axis. The latter will be the case where a single row is made up of alternate upper and lower sandwich elements.

The engagement member may be rotated by a drive unit and the drive unit may be different to the one configured to drive the engagement member to move between an initial or starting position and a final position.

In a preferred embodiment, the engagement member is freely rotatable about its rotational axis. In this way, the engagement member is rotatable about its rotational axis independently of any drive unit. When the drive unit drives the engagement member to move from a starting to a final position, a sandwich element engaged by the engagement member will be caused by the velocity/acceleration of movement to rotate about the rotational axis. The velocity and/or acceleration is controlled or set such that subsequently, when the engagement member is driven to decelerate or to stop, the sandwich element continues to rotate about the rotational axis by inertia. In this way, the trailing edge is caused to be raised at or above the level or height of the rotational axis or engaged lateral edge. It will be apparent that if the rotational axis of the engagement member is driven to move generally to the right, the engagement member with engaged sandwich element will freely rotate in a clockwise direction and, vice versa, in an anti-clockwise direction if the rotational axis of the engagement member is driven to move generally to the left.

Preferably, the engagement member comprises a pair of jaws or grippers moveable between an open position and an engaged position. In one embodiment, the jaws are moveable by pneumatic or hydraulic means. In another embodiment, the jaws are moveable by magnetic means, optionally in combination with pneumatic or hydraulic means. In a further embodiment, the jaws are moveable by mechanical means, such as gears, operable by electronic means.

The pair of jaws may comprise a lower jaw and an upper jaw for engaging the respective upper and lower edge portions of a sandwich element. A pair of jaws may be provided at respective ends of the engagement member. The lower jaw is preferably wedge-shaped, having a leading end for engaging beneath a side edge of a sandwich element.

In one embodiment, the drive unit drives an arm member, pivotally connected to the engagement member, which in turn drives the engagement member. The arm member is preferably arranged to be moveable in three dimensions. In this way, the engagement member can be moved in the direction of movement of the conveyor and in the motion profile for inverting and displacing a sandwich element, simultaneously. Preferably, a plurality of interconnected arm members are provided.

In second aspect, the invention provides a machine for making sandwiches comprising a movable conveyor capable of receiving sandwich elements arranged in at least two rows extending in the direction of movement of the conveyor, a depositing device arranged and adapted to deposit a sandwich filling on each of the sandwich elements of a first of two adjacent rows on the conveyor, and an apparatus as described above arranged for engagement with the sandwich elements of a second row, whereby each of the latter sandwich elements is inverted, laterally displaced and superimposed on a corresponding sandwich element of the first row on which a filling has been deposited.

In the sandwich making machine above, alternate sandwich elements in a transverse row across the conveyor are inverted and placed respectively on the remaining sandwich elements in the row. In an alternative embodiment of the second aspect of the invention, the depositing device of the machine is arranged and adapted to deposit a sandwich filling on alternate sandwich elements in a row extending in the direction of movement of the conveyor, and the apparatus as described above is arranged for engagement with the unfilled or wet lidded sandwich elements, whereby each of the unfilled sandwich elements is inverted, laterally displaced and superimposed on an adjacent sandwich element in the same row on which a filling has been deposited.

Preferably, at least one sensor and/or camera is disposed external relative to the drive unit and engagement means that provides position feedback to the control unit, wherein the control unit controls the drive unit based on the position feedback.

The control unit may be configured to set a predetermined velocity, acceleration and/or deceleration value based on a value input from a user.

In a third aspect, the invention provides a process of automatically inverting and displacing articles, comprising the steps of:

providing an engagement member adapted to engage a lateral edge portion of a sandwich element;

providing a drive unit configured to drive the engagement member so that a sandwich element engaged thereby is lifted and turned about its opposite lateral edge to be inverted ("the inverting step");

providing a control unit configured to control the drive unit;

configuring the control unit to control the drive unit to drive the engagement member so that the opposite lateral edge or trailing edge of the sandwich element is caused to be raised to approximately at or above the level or height of the engaged lateral edge portion and, optionally, to subsequently lie in a generally horizontal plane.

Preferably, the process comprises configuring the control unit to control the drive unit to move the engagement member downwardly, after the inverting step or when the sandwich element lies in the generally horizontal plane.

Preferably, the process comprises configuring the control unit to control the drive unit to cause the engagement member to accelerate, more preferably to accelerate during the inverting step.

Preferably, the process further comprises configuring the control unit to control the drive unit to cause the engagement member to decelerate or to move at a constant velocity after the inverting step.

Preferably, the process further comprises configuring the control unit to control the drive unit to cause the engagement member to move vertically downwardly prior to release of the sandwich element from the engagement member upon completion of the process.

Preferably, the process further comprises configuring the control unit to control the drive unit to operate a motion profile for the engagement member comprising an arc portion, optionally followed by a straight portion.

Preferably, the process further comprises configuring the control unit to control the drive unit to drive the downward motion of the engagement member at a velocity or deceleration that allows a raised trailing edge of the sandwich element to lower under the influence of gravity before the next placing step.

The process may comprise configuring the control unit to control the drive unit based on position feedback from a sensor. Alternatively, the process may comprise inputting a set velocity, acceleration and/or deceleration value into the control unit.

Preferably, the inverting step of the process according to the invention comprises inverting a first row of sandwich elements onto a second parallel row of sandwich elements.

Preferably, the process further comprises configuring the control unit to drive the engagement member to position it adjacent a lateral edge of the sandwich element, optionally further comprising configuring the control unit to drive the engagement member to subsequently accelerate towards the lateral edge, in the direction of the main axis, so that the engagement member receives the lateral edge.

The acceleration value at this initial stage of the process is such that the sandwich element remains in position on the conveyor as the lower jaw of the engagement member is positioned underneath its lateral edge portion. Preferably, the acceleration value at this stage is between about 60 and about 20 m/s², such as 30, 40 or 50 m/s².

Preferably, the articles are food items.

BRIEF DESCRIPTION OF THE FIGURES

The invention will now be described with reference to the accompanying drawings, in which.

DETAILED DESCRIPTION OF THE INVENTION

Figure 12:
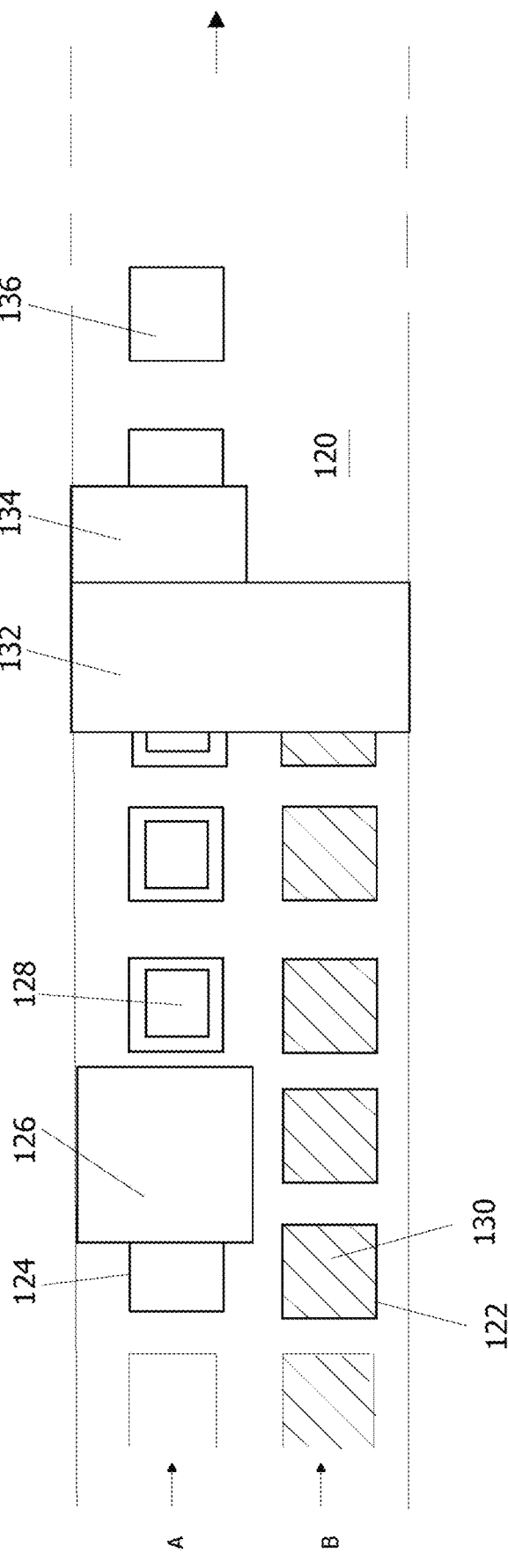
FIG. 12 shows a plan view of a sandwich machine comprising the apparatus of the invention.

With reference to FIG. 12, a typical sandwich machine embodying the present invention may include an endless conveyor 120. It is common for the two halves of a sandwich, upper and lower slices, 122 and 124, to travel down a conveyor 120 next to each other in two rows A, B. Typically they are spaced about 25 to 50 mm apart, side-to-side and end-to-end. The upper and lower slices, 122 and 124, move along the conveyor 120 at a rate of around 50 slices per minute.

The conveyor 120 moves the lower sandwich slices 124 beneath a depositor 126 which deposits a topping or filler 128 on all of the lower slices 124 in alternate rows extending lengthwise of the conveyor 120. On the upper slices 122 that are not topped is a spread 130, such as butter or mayonnaise.

The rows A, B, of slices are moved along to a turnover or inverting apparatus 132 by means of which the upper untopped slices 122 in the row B are successively turned over by rotating them about a side edge and placed in superimposed relation to the lower slices 124 having the topping 128 thereon. The turnover device 132 is so arranged that the superimposed slices are brought into accurate alignment, the upper slices are dropped on to the lower slices on which the filling has been deposited and the sandwiches 136 are then passed beneath a belt 134 where they are squeezed together and then discharged at one end of the conveyor 120.

Figure 1:
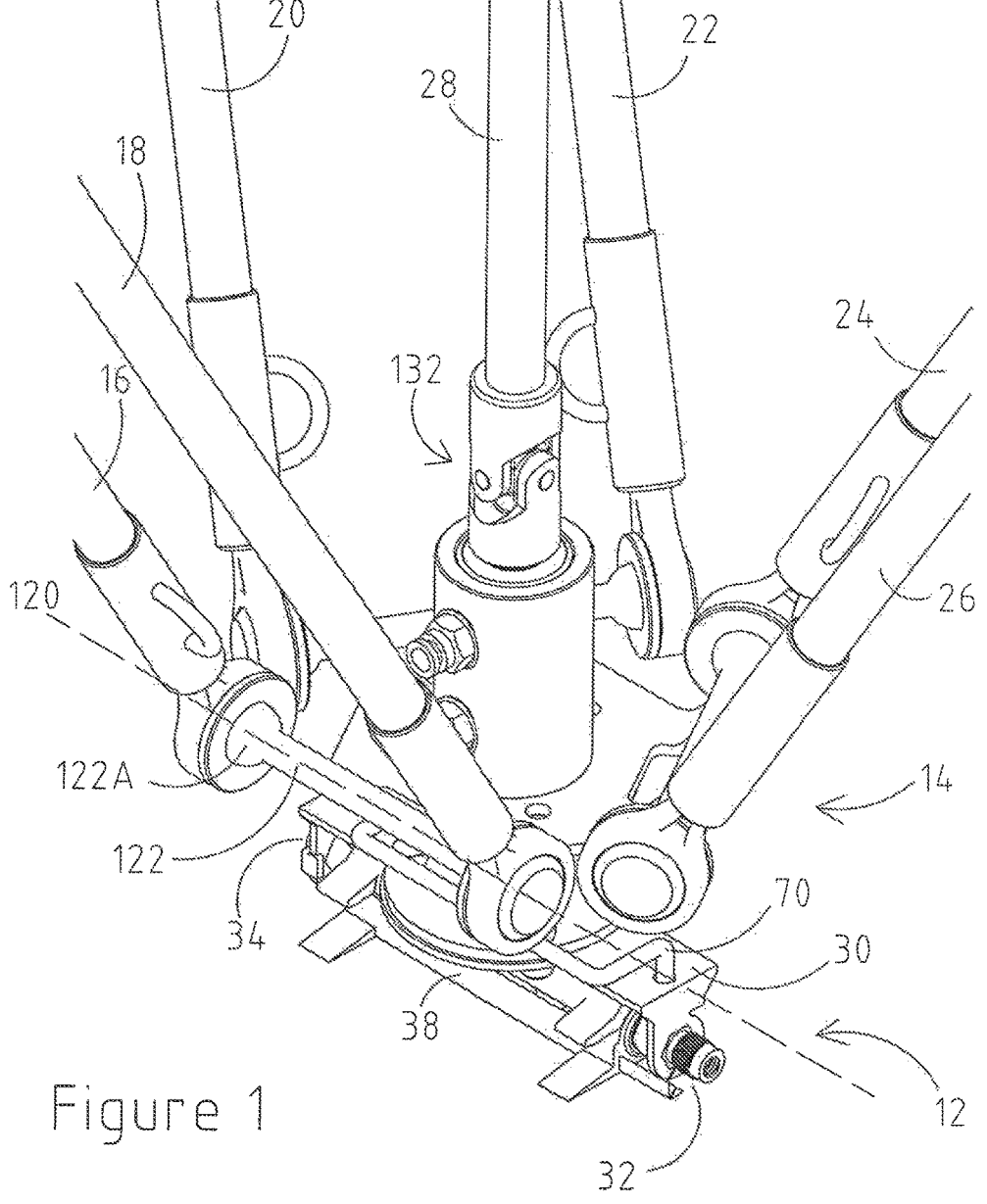
FIG. 1 shows a front perspective view from above and one side of one embodiment of an apparatus of the invention.

The general principles of operation of the sandwich making machine having been explained with reference to FIG. 12, reference will now be made to the FIGS. 1-11, which disclose details of exemplary inverting apparatus' according to the present invention. FIG. 1 shows one embodiment of an inverting apparatus, which comprises an engagement member 12, robotic apparatus 14 including a plurality of pivotally connected arm members, 16, 18, 20, 22, 24, 26, and a central shaft 28, a control unit (not shown) and a drive unit (not shown).

Figure 4:
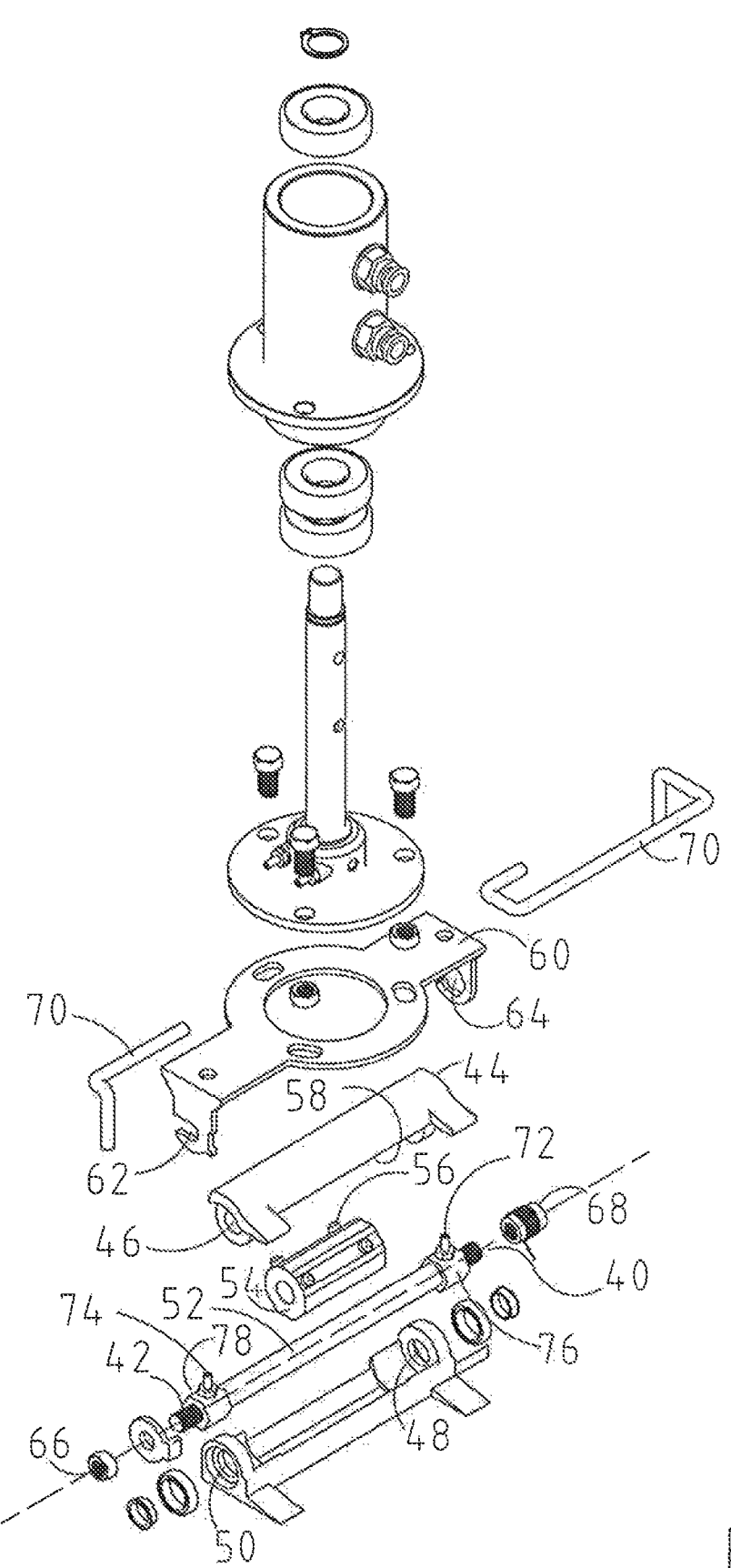
FIG. 4 shows an exploded view of the embodiment of FIG. 1 with some parts removed.

The engagement member 12 has a longitudinal body 30 with first and second ends 32, 34, and includes an upper jaw member 36 and a lower jaw member 38 rotatably connected to each other about a common rotational axis, shown by the dashed line in FIG. 4.

In the embodiment illustrated in FIGS. 1 to 4, the common rotational axis extends through pins 40, 42, provided at the first 32 and second 34 ends of the longitudinal body 30. Each pin 40, 42, is received in a respective apertures 44, 46 and 48, 50, formed at the ends of the upper and lower jaw members 36, 38. A hollow central tube 52 containing a magnetic cluster connects the pins. A magnetic cluster is also supported in the body of a carriage 54 outside the central tube 52. The carriage 54 is provided with external pieces 56 that engage helical slots 58 formed in the upper jaw member 36. A support bracket 60 provided with a cut out 62 at one end and an aperture 64 at the other end receives respective pins 42, 40, which are free to rotate about the rotational axis therein. Screws 66, 68, at each end retain the pins in position on the support bracket 60. An air conduit 70 carried by the support bracket 60 has a first air inlet 72 connected to the first and end of the central tube 52 and a second air inlet 74 connected to the second end of the central tube 52 thorough first and second connectors, 76, 78. As pressurized air is injected into the first air inlet 72, air is also injected into a check valve at the second air inlet 74 which opens the check valve and releases the pressurized air that was already in this part of the central tube 52. The actuation of air causes the magnet cluster within the central tube 52, along with the carriage 54 that is magnetically engaged therewith, to move linearly along the axis of the central tube 52 and along the lower jaw member 38, with the external pieces 56 moving in the helical slots 58 in the upper jaw member 36 to cause a rotary motion of the upper jaw member 36, with the result that the pairs of jaws 36A, 38A and 36B, 38B are caused close completely when the carriage 54 reaches the end of the tube 52.

Conversely, to move the jaws 36A, 38A and 36B, 38B, from the closed position to an open position, a jog-out mechanism such as a push button is activated, which changes the position of an air operated block valve, to inject pressurized air into the second air inlet 74. The air also is injected into a check valve at the first air inlet 72 at the other end which opens the check valve and releases the pressurized air that was already in this part of the tube 52, thus causing the magnetic cluster, along with the carriage 54 that is magnetically engaged therewith, to move linearly in the other direction along the axis of the central tube 52, with external projections 56 moving in the helical slot 58 to open the pairs of jaws 36A, 38A and 36B, 38B, completely when the carriage 54 reaches the end of the tube 52.

The pressurized air or other gas used to move the magnetic clusters and carriage can be supplied from various air sources, such as an air tank compressor as is known by persons skilled in the art.

With this combined magnetic/pneumatic embodiment, the carriage can be moved from one end to the other resulting in the jaws being fully open or closed, the positions being realized through the control of the amount of pressurized air being injected into the air inlets.

In the embodiment illustrated in FIGS. 5 to 8, the jaws 36A, 38A and 36B, 38B are moved between fully open and fully closed positions by pneumatic means. The upper and lower jaw members 36, 38 are rotatable about a pin 80 that is received within hollow tube sections 82 formed in the upper and lower jaw members 36, 38. The lower jaw member 38 is provided with a pair of apertures 84, 86 at each of its ends 32, 34 to receive first and second parallel flexible air tubes 88, 90. At one end 32 the air tubes 88, 90 are sealed. At the other end 34, air fittings 92, 94 allow air under pressure to be injected into and released from the tubes 88, 90, as required. The upper jaw member 36 is pressed against the air tubes 88, 90 and constructed such that when air under pressure enters one of the air tubes 88, 90, the tube expands causing the upper jaw member 36 in contact therewith to rotate about the rotational axis of the pivot pin 80 to the open the jaws 36A, 38A and 36B, 38B. Release of air under pressure from the tube 88 and injection of air into the other tube 90 causes the upper jaw member 36 to rotate in the opposite direction, causing the jaws 36A, 38A and 36B, 38B to close.

Figure 9:
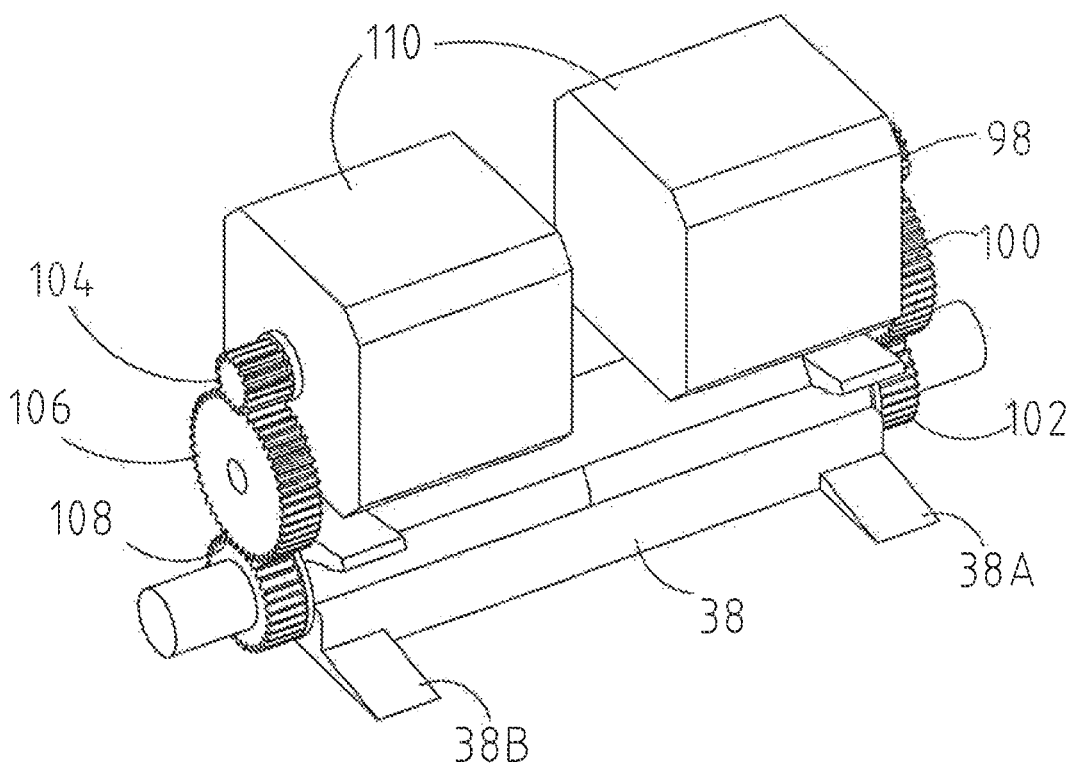
FIG. 9 shows a front view from above and one side of a further alternative engagement member of an apparatus of the invention.
Figure 10:
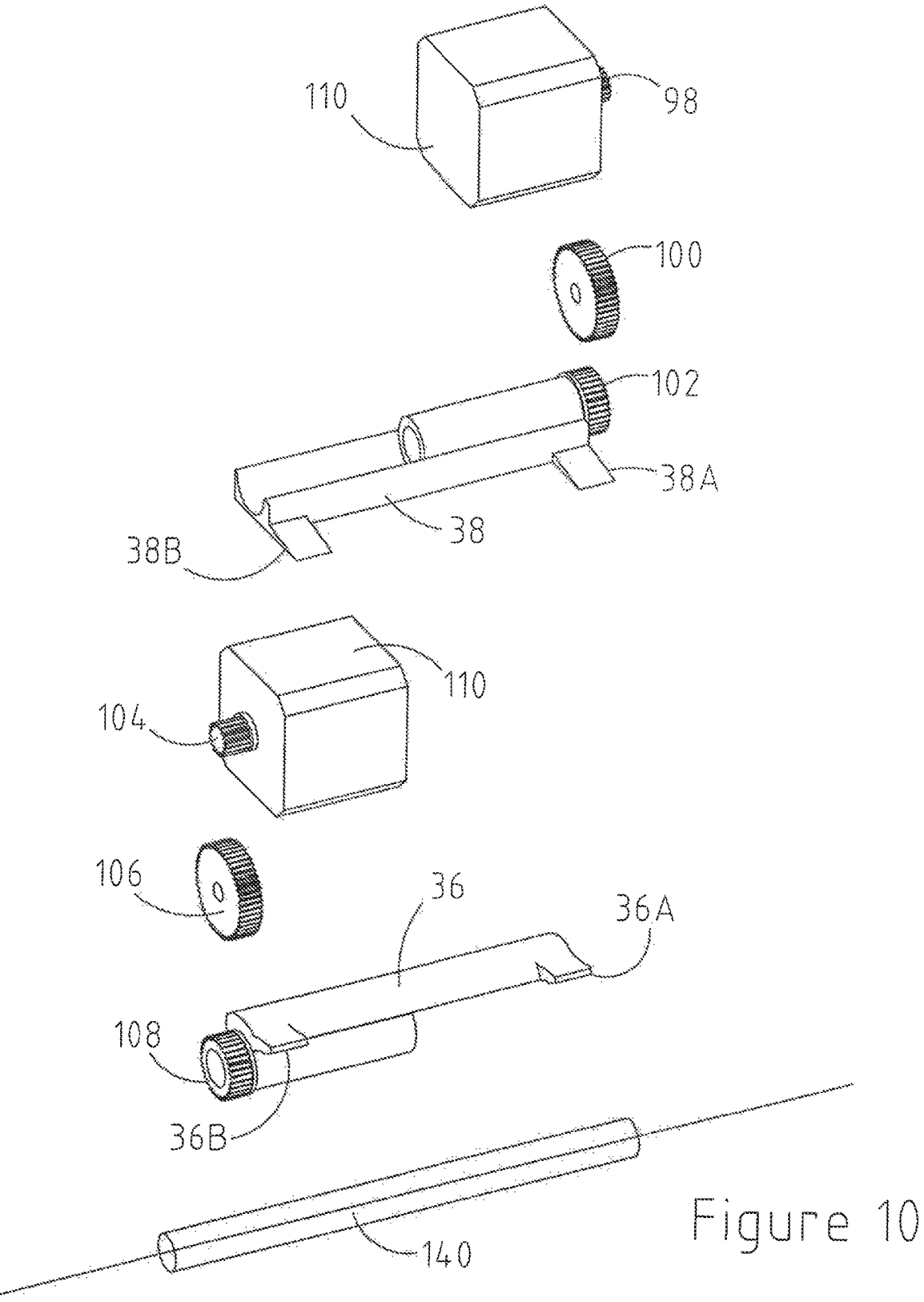
FIG. 10 shows an exploded view of the embodiment of FIG. 9.

In the embodiment illustrated in FIGS. 9 and 10, the jaws 36A, 38A and 36B, 38B are moved between fully open and fully closed positions by electro-mechanical means. Unlike in the previous embodiments, an active element is employed to rotate the jaws about the rotational axis. A series of gears 98, 100, 102 and 104, 106, 108, provided at the respective first and second ends of the jaw members 36, 38, connect the jaw members to a stepper motor 110, which drives the motion of the upper and lower jaw members 36, 38, about the rod 140 on a rotational axis (dashed line). The stepper motor 110 is under the control of an electronic module (not shown) that can rotate the upper and lower jaw members 36, 38 independently. By moving in opposite directions relative to each other, the jaws 36A, 38A and 36B, 38B can be moved between open and closed positions. The stepper motor 110 is also set to cause the upper and lower jaw members as a combined unit to pivot about the rotational axis as the engagement member 12 is driven by the drive unit. A further feature could be employed whereby the torque applied by the motor is measured and the motor signal continuously varied so that the sandwich element follows its natural path rather than being turned by the motors.

Figure 5:
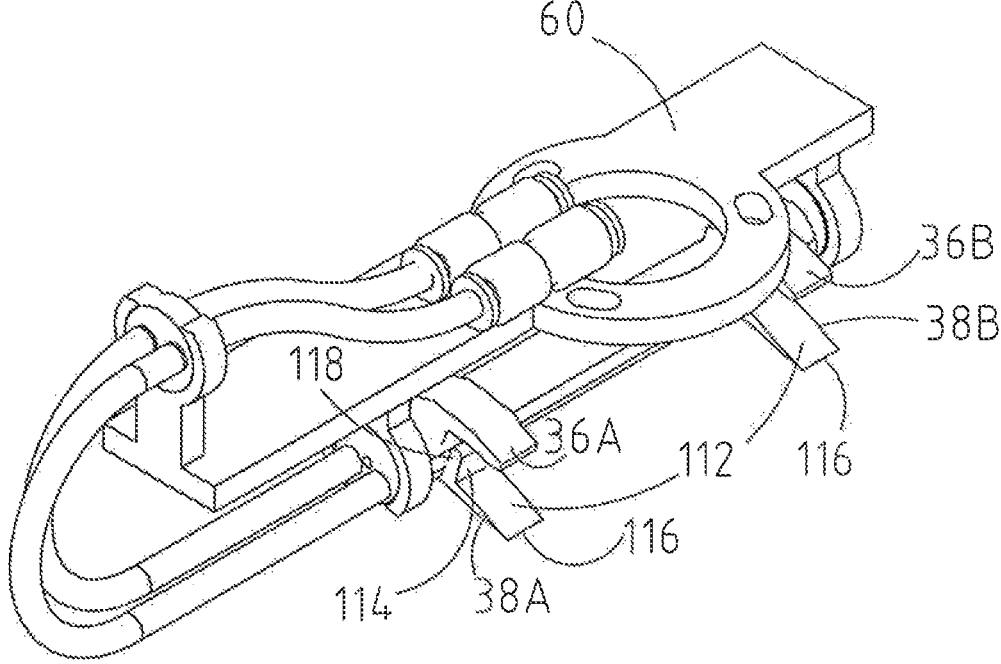
FIG. 5 shows a front perspective view from above and one side of an alternative engagement member of an apparatus of the invention.
Figure 6:
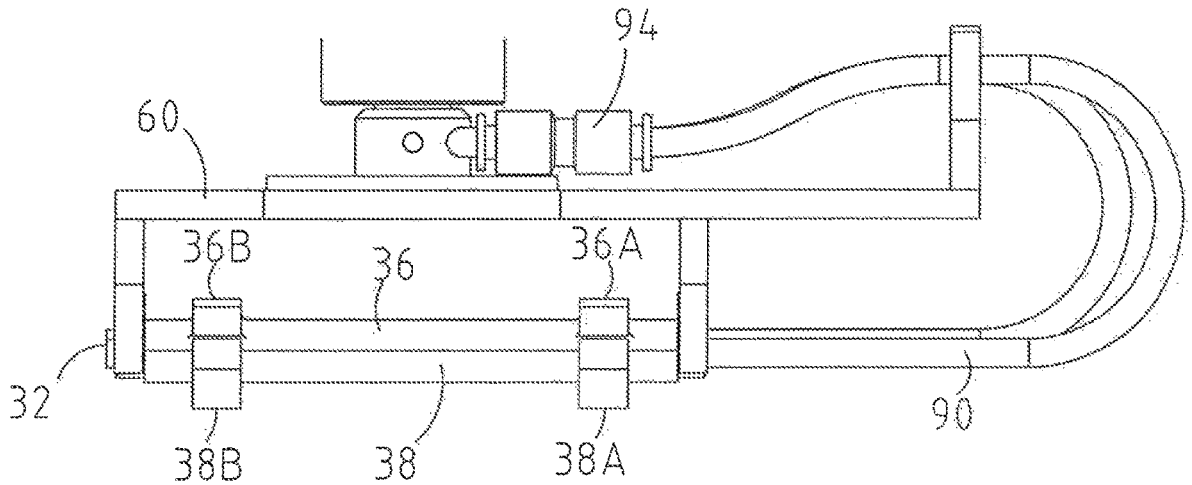
FIG. 6 shows a front perspective view of the alternative embodiment of FIG. 5.
Figure 7:
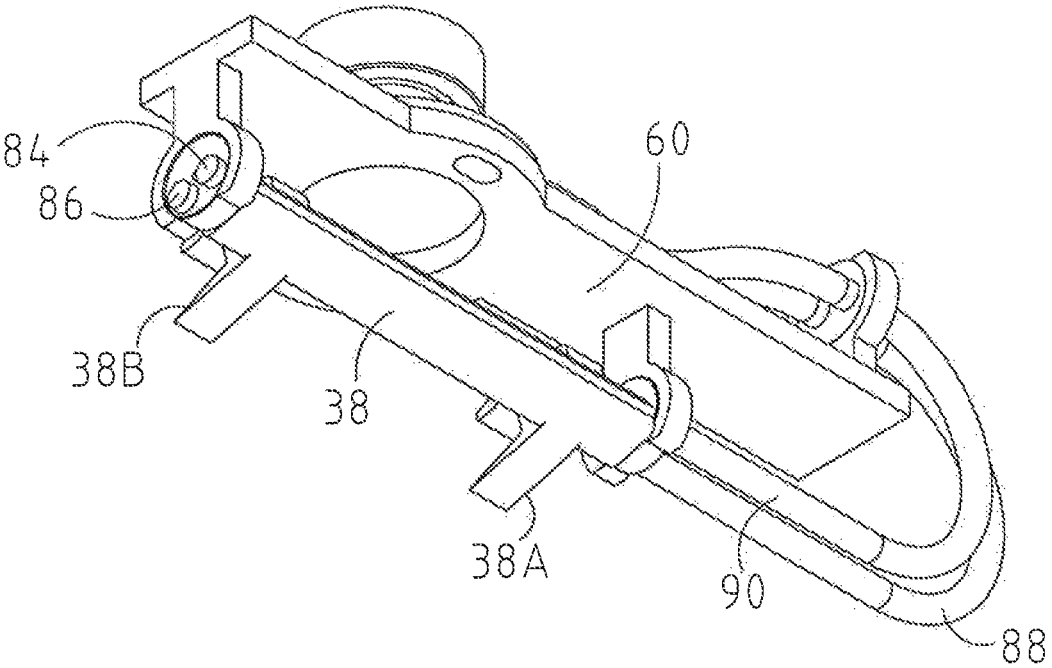
FIG. 7 shows a rear perspective view from below and one side of the alternative embodiment of FIG. 5.
Figure 8:
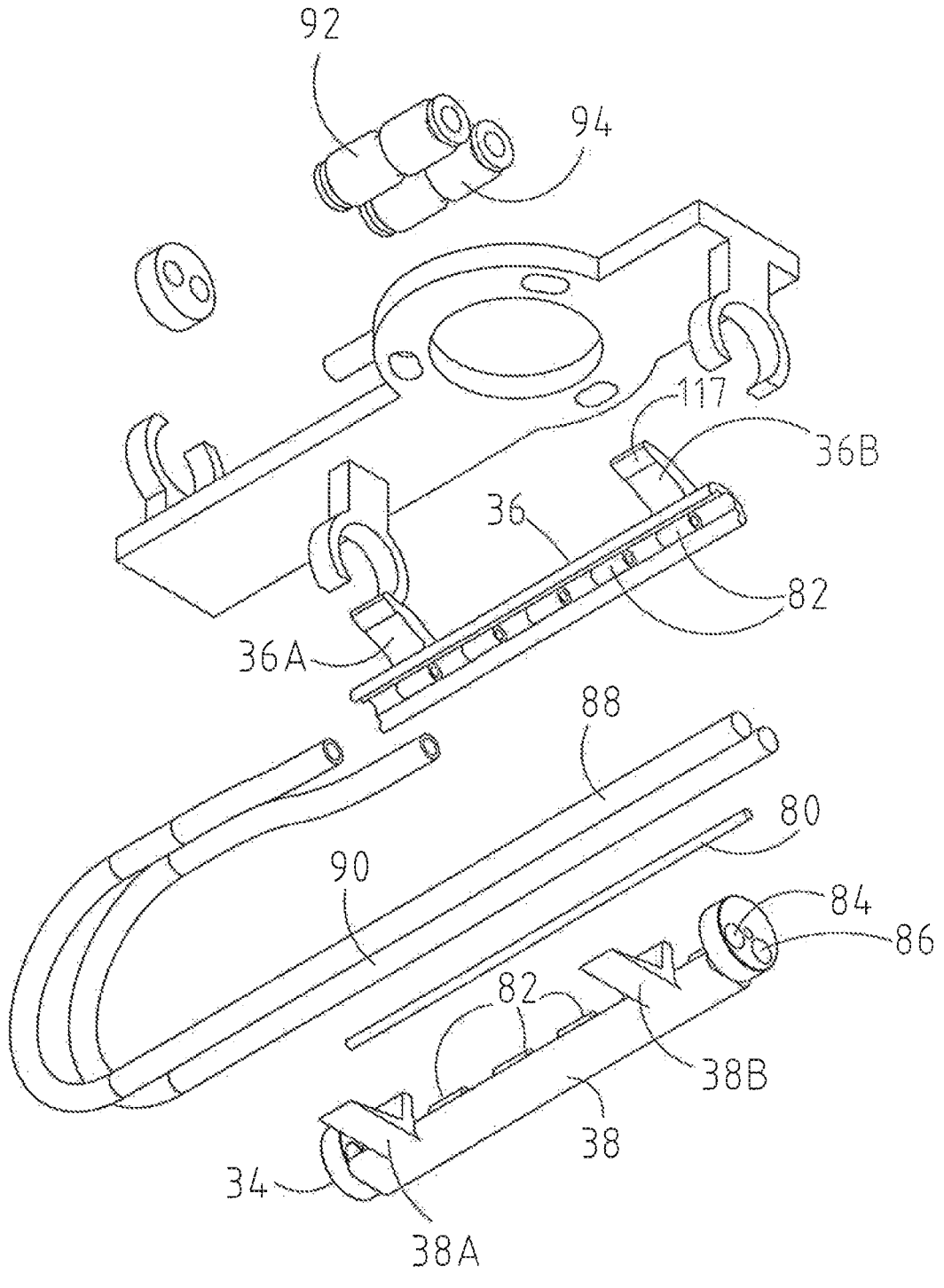
FIG. 8 shows an exploded view of the alternative embodiment of FIG. 5.

In all of the embodiments described, the engagement member includes two pairs of jaws 36A, 38A and 36B, 38B, one for each end of a slice lateral edge. The lower jaws 38A, 38B each have a ramp or wedge member 112 having, as shown in FIG. 5, for example, an upwardly and rearwardly inclined surface. The inclination is at an angle of about 10%, terminating in a shoulder/vertical section 114 near the rear end of the lower jaws 38A, 38B. The leading end of the wedge member 112 has a chisel-like edge 116 to engage beneath the side edge of a sandwich slice carried by the conveyor. The wedge 112 lifts the slice about its edge. The vertical section 114 engages the edge of the slice. The upper jaws 36A, 36B each have an inner gripping surface 117 provided with ridges. The upper jaws 36A, 36B each have a re-entrant feature 118 that aligns with the inside of the bread crust. When the upper and lower jaws are closed, the edge of the bread is held firmly.

Figure 2:
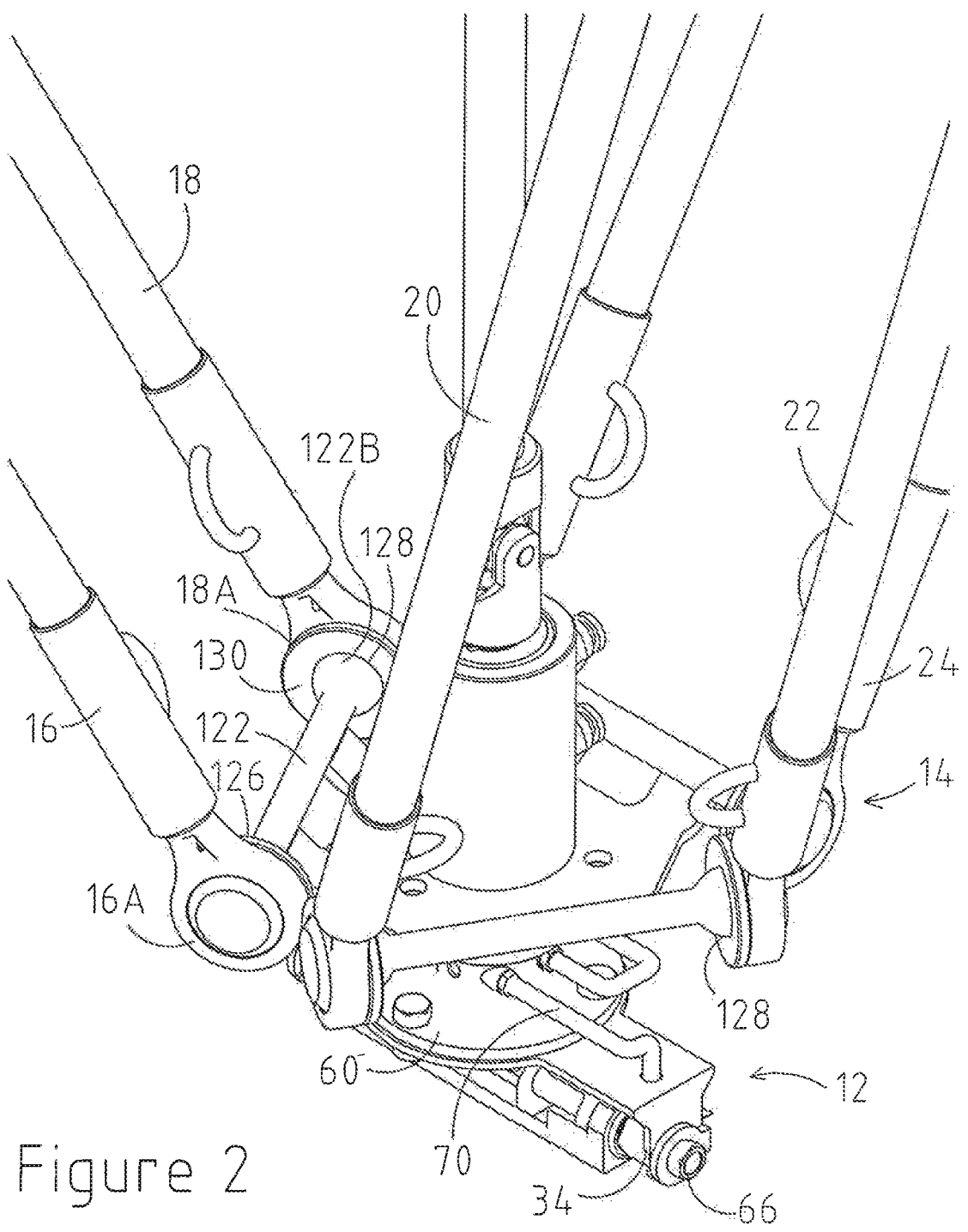
FIG. 2 shows a rear perspective view from above and the other side of the embodiment of FIG. 1.
Figure 3:
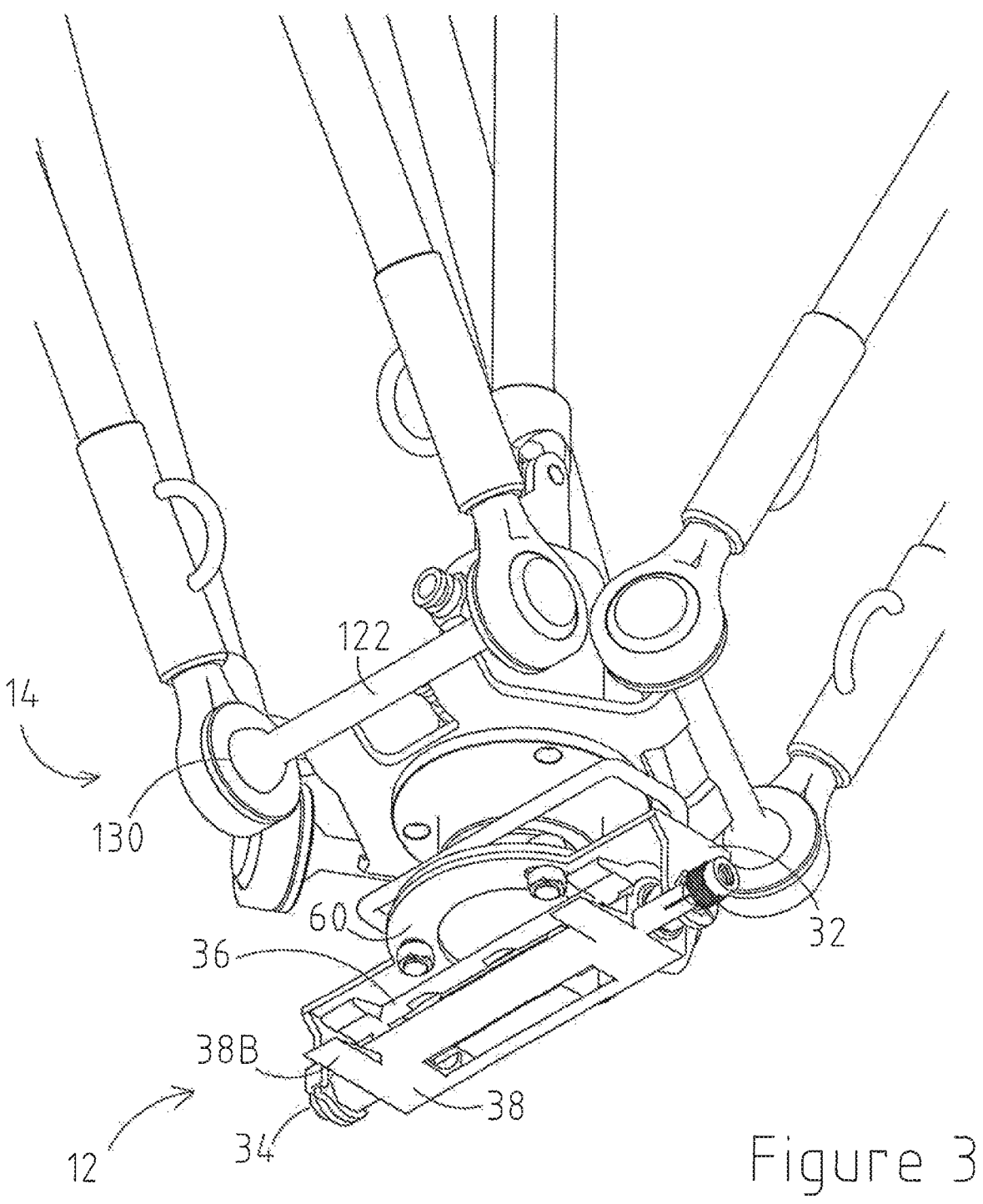
FIG. 3 shows a front perspective view from below and one side of the embodiment of FIG. 1.

A configuration of a robotic apparatus 14 will be described according to an exemplary embodiment of the invention. FIGS. 1 to 3 illustrate an exemplary robotic apparatus 14 that includes a robot controller (or control unit) (not shown). The robotic apparatus 14 includes a plurality of arm members 16, 18, 20, 22, 24, 26 that are independently pivotable. First arm 16 and second arm 18, are exemplary arm members, each of which and is rotated/moved by a respective drive unit provided therein or in association therewith (not shown). The first arm 16 is rotatable about a pivot axis at its proximal end (not shown) and a pivot axis (dashed line 120) at its distal end 16A. A connecting shaft 122 connects the distal ends 16A, 18A, of the first and second arms 16, 18. The distal ends of the first and second arms each have a socket joint 126, 128 adapted to receive a respective ball member 122A, 122B provided at both ends of the connecting shaft 122. The ball members 122A, 122B, freely rotate in the socket joints 126, 128 and are held therein by a collar 130.

A central shaft 28 is provided with a universal joint 132 and transmits rotary power at any selected angle. The robotic apparatus 14 as a whole is adapted to drive the engagement member 12 along the motion path described in three dimensions as the articles are carried laterally by a conveyor.

The control unit (not shown) outputs commands to drive units to bring each of the central shaft 28, first arm 16, second arm 18, etc., into motion, as will be described in further detail below. The control unit communicates with the drive units directly, or in conjunction with an intermediate control device, which can include an amplifier. The control unit can also receive instructions from a higher level device such as a programmable logic controller, for example.

The movements are accomplished by a corresponding drive unit constituted by a motor drive or servo motor, for example. Each drive unit provides feedback that indicates at least a positon of the respective robotic apparatus part to the control unit. The control unit controls the operation of drive units in accordance with the feedback information to control the position of each of the central shaft, the first arm, second arm, etc.

The control unit includes a processing unit and a memory. A processing unit is a processing device such as a micro-processor or CPU and communicates with memory and executes instructions (e.g., software programmes). A velocity value is stored in memory, which is a storage device such as a hard disk. The velocity value allows the control unit to command the drive units based on the velocity applied when the robotic apparatus is brought into motion in order to transport sandwich element. The velocity value (including acceleration and deceleration values) can be predefined determined in advance or set by a user.

The control unit is in communication with a user interface that includes an input device and a display that can include a visual display. The control unit includes a wired and/or wireless communication interface to communicate with input device (e.g., mouse/keyboard) and display. The communication interface can also receive feedback from each of the drive units and output commands to the respective drive units. If an external sensor or camera is used to provide position feedback, this feedback information is also received by communication interface. A user can interact with input device to configure/set the required predetermined velocity/acceleration/deceleration.

An exemplary path representing the actual motion path of the engagement member between a start position and a finish position includes both a straight line segment and an arc-shaped or curved segment having a constant radius. The path alternatively could include a parabolic curve. After the sandwich element is transported to the finish position where the upper sandwich element is released, the robotic apparatus can withdraw from the corresponding station. At each withdrawal, the robotic apparatus can enter a standby position to await or perform a transfer of another sandwich element, where the robot moves from the finish position to a start position without a sandwich element.

The operation of the apparatus will now be briefly summarized.

Figure 11:
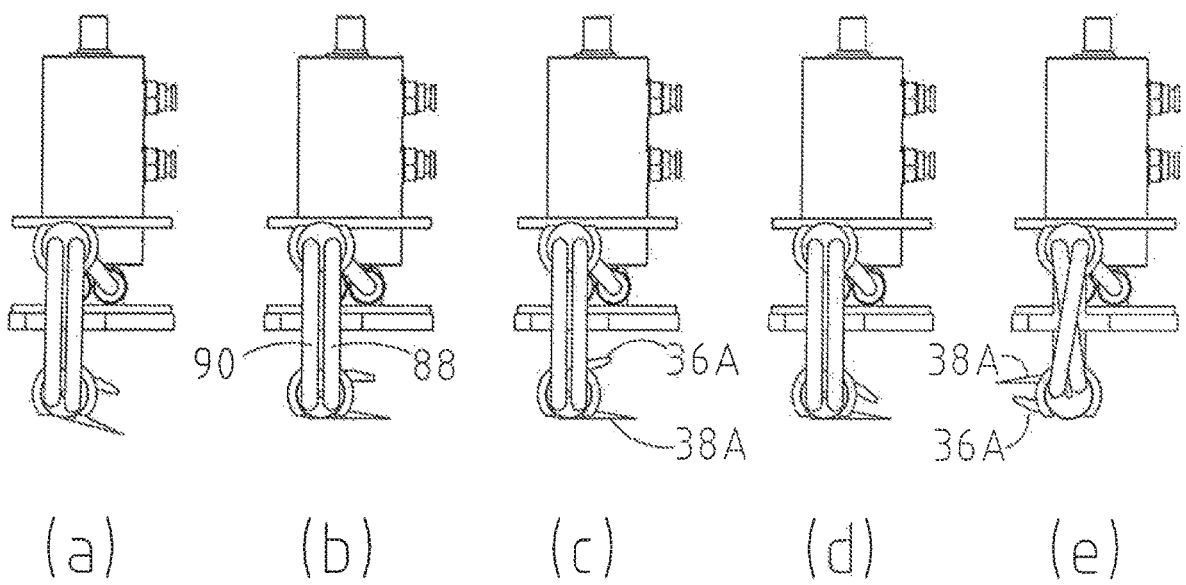
FIG. 11 shows a view from one side of a component of the apparatus of the invention at various stages in its operation from (a) idle or rest position; (b) initial position; (c) intermediate position, jaws open; (d) intermediate position, jaws closed; and (e) final flipped position.

In order to insert the lower jaws 38A, 38B under the bread, the robotic apparatus 14 guides the engagement member 12 to the edge of the sandwich element (see FIGS. 11 (a) and (b)), and then accelerates driving the sharp leading edges 116 of the lower jaws 38A, 38B between the conveyor belt and the sandwich element (FIG. 11 (c)). This is carried out at a high acceleration to prevent the sandwich element sliding on the conveyor belt. Also, the inertia of the sandwich element combined with the sticking of the sandwich element to the conveyor belt allows a force caused by the acceleration to be applied by the leading edge 116 of the lower jaws sufficient to distort the edge of the sandwich element and thereby to allow them to slide under the sandwich element.

Once the lower jaws are fully located under the sandwich element, the upper and lower jaws are closed (FIG. 11 (d)) and the sandwich element is effectively held along its lateral edge.

The robotic apparatus 14 drives the engagement member 12 to accelerate and traverse an approximate arc that takes the gripped edge of the upper sandwich element towards the outside edge of the lower sandwich element. Because the engagement member 12 is free to rotate on its rotational axis, and if the acceleration and velocity are sufficiently high and controlled, the path the wet lid or upper sandwich element takes involves it rotating and the opposite ungripped edge moving in the opposite direction to the gripped edge.

This is simply the inertia of the sandwich element and the fact that it is being moved off its centre of gravity. With careful control, the path of the sandwich element can be made to complete the arc with the upper sandwich element now upside down, or rotated by approximately 180 degrees, and parallel to the lower sandwich element (FIG. 11 (e)) as it 'lands' on top of it. At this point the jaw members are released and the engagement member is moved into its home (rest) position (FIG. 11 (a)) ready to repeat the operation with the next sandwich element. A coil spring returns the engagement member back to its home position.

The travel of the sandwich elements is viewed by a camera system that identifies the edge positions of the upper and lower sandwich elements and passes the information to the control unit. The control unit then calculates the path, which may also include an angular component, to position the engagement member correctly.

During transportation, the engagement member initially has a velocity equal to zero and is at rest within station. The sandwich element is subsequently transported by the robotic apparatus along a first path segment to a raised position located in a curved line path from the start station. The engagement member is accelerated beginning from the start station and decelerated (or imparted with negative acceleration) as it approaches the final position prior to reaching its final position. It follows a straight line path in the final path segment. Thereafter, the engagement member can transition smoothly to the first path segment. Prior to controlling the drive units to impart motion to the robotic apparatus, the control unit determines a motion profile to invert and transport the sandwich element to the required location.

The control unit continuously monitors the position of each of the arms and central shaft from encoders and/or sensors. The control unit can also calculate a velocity. The determined velocity can be employed to control transport in two dimensions or in three dimensions and can take the relationship between rotational and linear acceleration/deceleration into account.

The acceleration determined motion profile provides a secure and efficient transfer of a first sandwich element by ensuring that reaction forces resulting from the acceleration of the first sandwich element overcome the force of gravity at the non engaged part of the first sandwich element initially and then allow the force of gravity to bring the first sandwich element into correct position onto the second sandwich element.

The apparatus according to the present invention allows the 'wet lidding' of filled sandwiches at a production rate of around 50 sandwiches per minute with little disturbance of a loose filling and accurate placement.

The actuation of the jaw members is self-contained and small enough that the engagement member can be allowed to pivot freely. The engagement member needs to be compact when used in a sandwich making machine. First, it needs to be compact to enable it when turned through 180 degrees to still be above the level of the conveyor belt when the lower jaw member is turned over and level with the top of the filled upper sandwich element. It also needs to be compact as there are often four rows of sandwich elements, two rows of sandwiches and only a small gap within which the jaw members can be lowered. The engagement member is able to hold a sandwich element sufficiently tightly to enable high accelerations and speeds. The controlled high acceleration used in operation of the apparatus of the present invention can effectively make an upper sandwich element land square onto a lower sandwich element without 'dragging' loose material from the top of the filling.

Furthermore, once gripped, the 'wet lidding' can be achieved entirely by the motion of the robotic apparatus (other than the opening and closing of the jaws) rather than through active elements of the engagement member. An otherwise 'floppy' slice of bread can be positioned by gripping it along one edge only and accelerating it sufficiently that the forces of gravity acting to bend it are outweighed by acceleration forces that effectively stretch it out flat. Thus, a reaction force is generated that exceeds a force of gravity.

Definitions

The following definitions shall apply throughout the specification and the appended claims.

The singular forms "a," "an," and "the" include plural reference unless the context clearly dictates otherwise.

Within the context of the present specification, the term "comprises" is taken to mean "includes" or "contains", i.e. other integers or features may be present, whereas the term "consists of" is taken to mean "consists exclusively of".

Within the present specification, the term "about" means plus or minus 20%; more preferably plus or minus 10%; even more preferably plus or minus 5%; most preferably plus or minus 2%.

Within the present specification, the term "filled sandwich" is not intended to be limited to an item comprising two or more pieces or slices of bread that serve as a container or wrapper for another food type but is to include any item comprising at least two members that serve as a container or wrapper for a different member arranged in between. The term is intended to include sandwich-type biscuits or cookies, cakes, confections and the like.

The term "sandwich element" is intended to mean the bread piece or slice, cake or biscuit forming the upper or lower part of the completed sandwich.

A "filling" is intended to mean the kind comprising a loose or non-stick filling, that is, a filling that when applied to a piece of bread does not tend stick to the bread, that is, does not remain in position when the bread is inverted.

Unless otherwise stated or indicated, the terms such as "above", "below", "upper", "lower", "horizontal", "vertical", "right", "left" and the like, are used as words of convenience to provide reference points and are not to be construed as limiting terms. In the context of the embodiments described herein, the mentioned terms are used in relation to the conveyor of the sandwich elements which lies in a generally horizontal plane at a base level.

Although the present invention has been described with respect to presently preferred embodiments, the present invention should not be limited to the embodiments, and it will be appreciated by those skilled in the art that various modifications may be made without departing from the spirit and scope of the present invention. For example, the exact form of the robotic apparatus can vary within the scope of the present invention. In the examples described herein, the robotic apparatus has been constructed and arranged such that articulation is possible in the limited space available in a sandwich making machine. Also, although the present invention has been described with respect to food items such as sandwiches, and the like, it will be apparent that the apparatus could readily be utilized for analogous operations, not only in food processing, but in the handling of any type of item for manufacturing operations and the like. However, transportation, transfer, and manipulation of a variety of different elements with various sizes and shapes are possible. Furthermore, non-essential elements may be removed from the apparatus if so desired without detracting from the advantages derived from the present invention disclosed herein.

The invention claimed is:

1. An apparatus for inverting and displacing a floppy article, comprising:
an engagement member adapted to engage a lateral edge portion of a sandwich element;
a drive unit configured to drive the engagement member to move in a motion profile, wherein the motion profile comprises a straight portion and an arc portion; and
a control unit configured to control the drive unit to operate the motion profile for the engagement member, whereby the sandwich element engaged by the engagement member is lifted in the straight portion of the motion profile and turned about the opposite lateral edge to invert the sandwich element in the arc portion of the motion profile and the opposite lateral edge of the sandwich element is caused to be raised to approximately at or above the level or height of the engaged lateral edge portion during the inverting.

2. An apparatus according to claim 1, wherein the control unit is configured to control the drive unit to drive the engagement member so that an acceleration occurs in the motion profile.

3. An apparatus according to claim 1, wherein the control unit is configured to control the drive unit to drive the engagement member so that a deceleration occurs in the motion profile.

4. An apparatus according to claim 1, wherein the engagement member is rotatable about a rotational axis.

5. An apparatus according to claim 4, wherein the engagement member comprises a pair of jaws, which, as a combined unit, is freely rotatable about a common rotational axis as the engagement member is driven by the drive unit.

6. A machine for making sandwiches, comprising a movable conveyor capable of receiving sandwich elements arranged in at least two rows extending in the direction of movement of the conveyor, a depositing device arranged and adapted to deposit a sandwich filling on each of the sandwich elements of a first of two adjacent rows on the conveyor, and an apparatus for inverting and displacing a floppy article, comprising:
an engagement member adapted to engage a lateral edge portion of a sandwich element;
a drive unit configured to drive the engagement member to move in a motion profile, wherein the motion profile comprises a straight portion and an arc portion; and
a control unit configured to control the drive unit to operate the motion profile for the engagement member, whereby the sandwich element engaged by the engagement member is lifted in the straight portion of the motion profile and turned about the opposite lateral edge to invert the sandwich element in the arc portion of the motion profile and the opposite lateral edge of the sandwich element is caused to be raised to approximately at or above the level or height of the engaged lateral edge portion during the inverting, wherein the apparatus is arranged for engagement with the sandwich elements of a second row, whereby each of the latter sandwich elements is inverted, laterally displaced and superimposed on a corresponding sandwich element of the first row on which a filling has been deposited.

7. A process of automatically inverting and displacing a floppy article, comprising:
providing an apparatus according to claim 1;

operating the engagement member to engage a lateral edge portion of a sandwich element;

operating the drive unit to drive the engagement member to move in a motion profile, wherein the motion profile comprises a straight portion and an arc portion;

operating the control unit to control the drive unit to operate the motion profile for the engagement member, whereby the sandwich element engaged by the engagement member is lifted in the straight portion of the motion profile and turned about the opposite lateral edge inverting the sandwich element in the arc position, whereby the opposite lateral edge or trailing edge of the sandwich element is caused to be raised to approximately at or above the level or height of the engaged lateral edge portion.

8. A process according to claim 7, comprising configuring the control unit to control the drive unit to cause the engagement member to accelerate during the inverting.

9. A process according to claim 7, further comprising configuring the control unit to control the drive unit to cause the engagement member to decelerate or to move at a constant velocity after the inverting.

10. A process according to claim 7, further comprising configuring the control unit to control the drive unit to cause the engagement member to move vertically downwardly prior to release of the sandwich element from the engagement member upon completion of the process.

11. A process according to claim 7, wherein the motion profile for the engagement member further comprises a straight portion that follows the arc portion.

12. A process according to claim 7, further comprising operating the control unit to control the drive unit to drive the engagement member to move at a velocity or deceleration that allows a raised trailing edge of the sandwich element to lower under the influence of gravity so that the sandwich element is caused to lie in a generally horizontal plane before the next positioning.

13. An apparatus according to claim 1, wherein the motion profile further comprises a straight portion that follows the arc portion.

\* \* \* \* \*